United States Patent
Bansal et al.

(10) Patent No.: US 7,818,418 B2
(45) Date of Patent: Oct. 19, 2010

(54) AUTOMATIC ROOT CAUSE ANALYSIS OF PERFORMANCE PROBLEMS USING AUTO-BASELINING ON AGGREGATED PERFORMANCE METRICS

(75) Inventors: Jyoti Kumar Bansal, San Francisco, CA (US); David Isaiah Seidman, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 420 days.

(21) Appl. No.: 11/688,475

(22) Filed: Mar. 20, 2007

(65) Prior Publication Data

US 2008/0235365 A1    Sep. 25, 2008

(51) Int. Cl.
*G06F 15/173* (2006.01)
(52) U.S. Cl. ........................ 709/224; 709/227
(58) Field of Classification Search ............. None
See application file for complete search history.

(56) References Cited

U.S. PATENT DOCUMENTS

| | | | |
|---|---|---|---|
| 6,182,022 B1 * | 1/2001 | Mayle et al. | 702/182 |
| 6,279,002 B1 * | 8/2001 | Lenz et al. | 707/10 |
| 6,584,501 B1 | 6/2003 | Cartsonis | |
| 6,587,878 B1 | 7/2003 | Merriam | |
| 6,763,380 B1 * | 7/2004 | Mayton et al. | 709/224 |
| 7,050,931 B2 | 5/2006 | Conrad | |
| 7,076,695 B2 * | 7/2006 | McGee et al. | 714/47 |
| 7,197,559 B2 * | 3/2007 | Goldstein et al. | 709/224 |

OTHER PUBLICATIONS

U.S. Appl. No. 11/559,755, filed Nov. 14, 2006, titled "Baselining Backend Component Error Rate To Determine Application Performance,".
U.S. Appl. No. 11/559,750, filed Nov. 14, 2006, titled "Baselining Backend Component Response Time To Determine Application Performance,".
"NetQoS SuperAgent—End-toEnd Performance Monitoring," data sheet, NetQos Inc. 2006 (printed on Dec. 13, 2006).
"Monitoring Application Response Time," application note, Fluke Networks 2003.
"Cisco Performance Visibility Manager 1.0" data sheet, Cisco Systems, Inc. 2006 (printed on Dec. 13, 2006).

* cited by examiner

*Primary Examiner*—Wen-Tai Lin
(74) *Attorney, Agent, or Firm*—Vierra Magen Marcus & DeNiro LLP

(57) ABSTRACT

Anomalous behavior in a distributed system is automatically detected. Metrics are gathered for transactions, subsystems and/or components of the subsystems. The metrics can identify response times, error counts and/or CPU loads, for instance. Baseline metrics and associated deviation ranges are automatically determined and can be periodically updated. Metrics from specific transactions are compared to the baseline metrics to determine if an anomaly has occurred. A drill down approach can be used so that metrics for a subsystem are not examined unless the metrics for an associated transaction indicate an anomaly. Further, metrics for a component, application which includes one or more components, or process which includes one or more applications, are not examined unless the metrics for an associated subsystem indicate an anomaly. Multiple subsystems can report the metrics to a central manager, which can correlate the metrics to transactions using transaction identifiers or other transaction context data.

33 Claims, 13 Drawing Sheets

Transaction 1 (TR1) execution path, 320

Transaction 2 (TR2) execution path, 340

Transaction 3 (TR3) execution path, 360

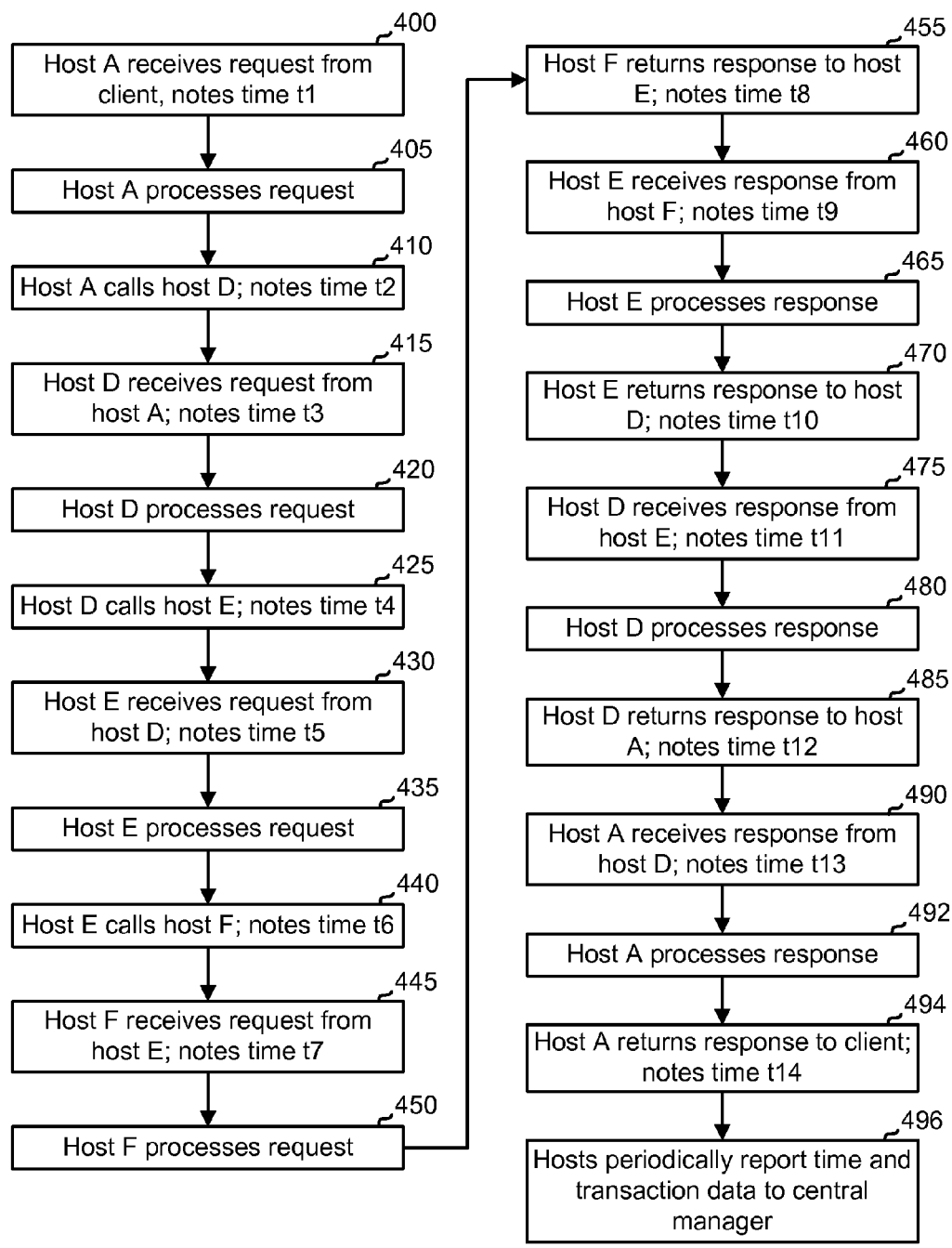

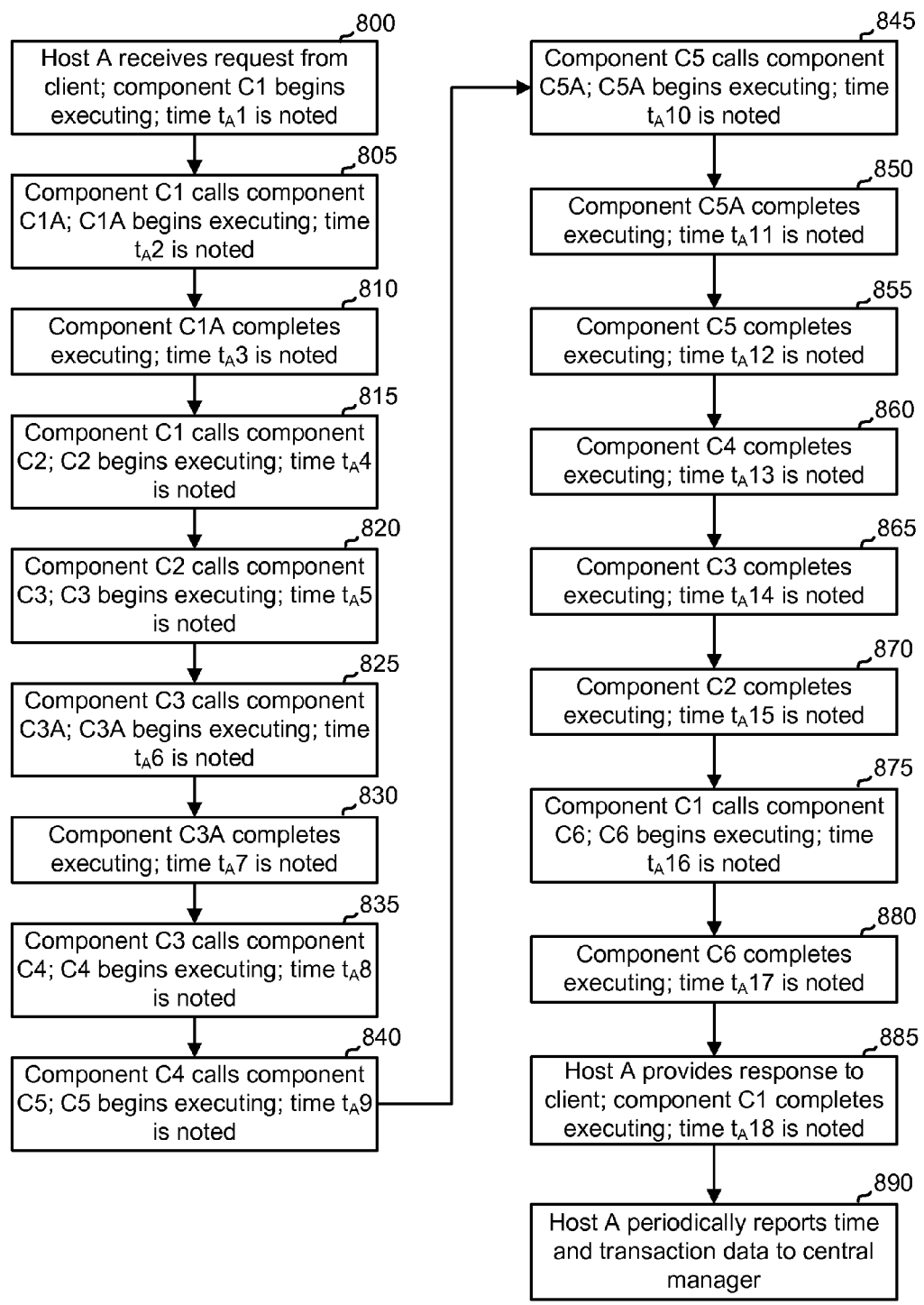

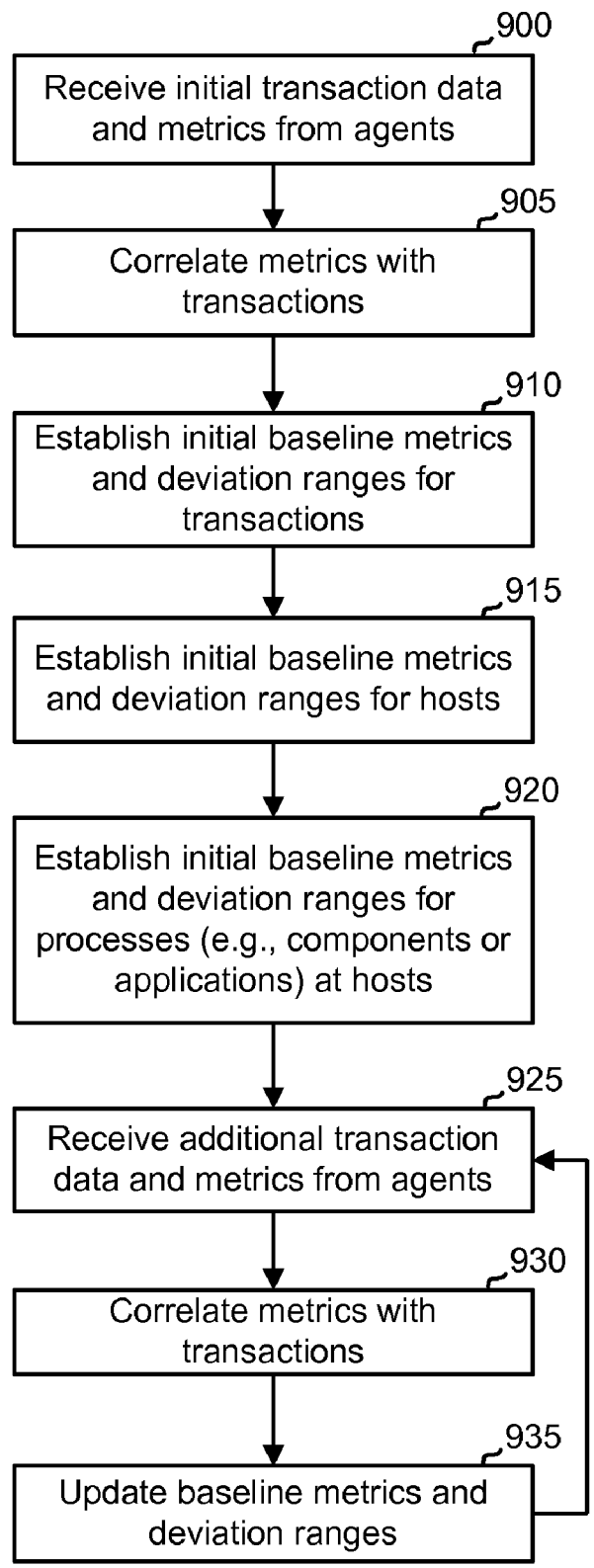

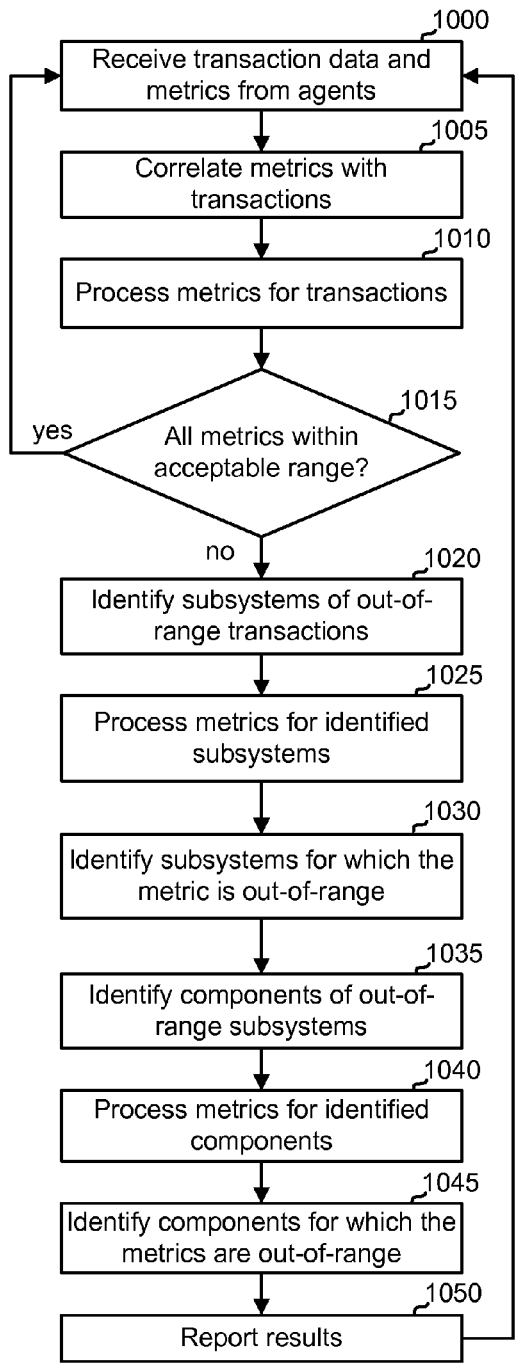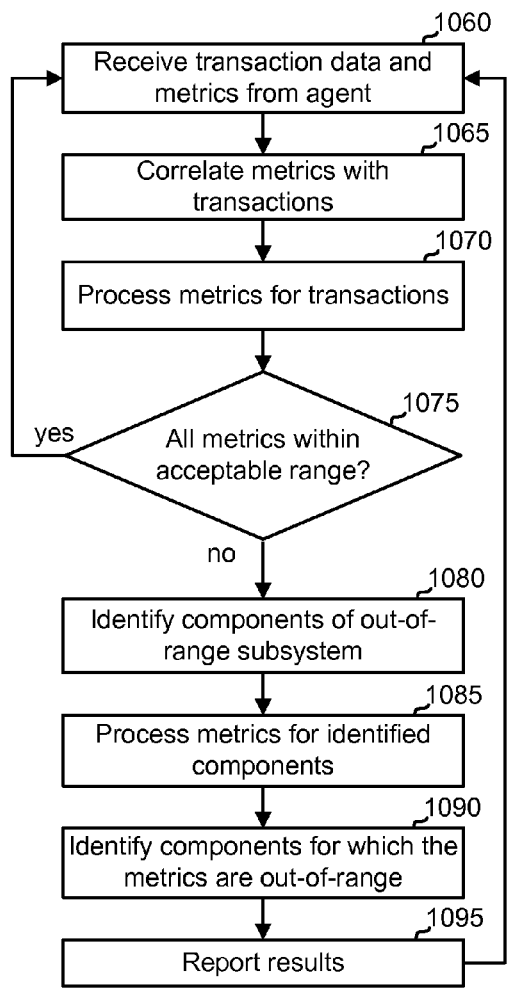

Fig. 11a

Host response time data by transaction ID (raw)

| Transaction ID | Host ID | start time | end time |
|---|---|---|---|
| TR1 | A | t1 | t2 |
| TR1 | D | t3 | t4 |
| TR1 | E | t5 | t6 |
| TR1 | F | t7 | t8 |
| TR1 | E | t9 | t10 |
| TR1 | D | t11 | t12 |
| TR1 | A | t13 | t14 |
| | | | |
| TR2 | A | t2.1 | t3.2 |
| TR2 | C | t5.3 | t7.2 |
| TR2 | A | t8 | t9.5 |
| | | | |
| TR3 | A | t4.7 | t5.2 |
| TR3 | B | t6.6 | t7.3 |
| TR3 | A | t11.5 | t15 |

Fig. 11b

Host error data

| Time | Transaction ID | Host ID | Error ID |
|---|---|---|---|
| t3.5 | TR1 | D | E200 |
| t5.5 | TR1 | E | E400 |
| t14 | TR3 | A | E300 |

Fig. 11c

Host A CPU load data

| Time | CPU load (%) |
|---|---|
| t0-t50 | 75 |
| t51-t100 | 50 |
| t101-t150 | 25 |

Fig. 12

Host response time data by transaction ID (elapsed)

| Transaction ID | Host ID | elapsed time |
|---|---|---|
| TR1 | A | (t2-t1)+(t14-t13) |
| TR1 | D | (t4-t3)+(t12-t11) |
| TR1 | E | (t6-t5)+(t10-t9) |
| TR1 | F | (t8-t7) |
| TR2 | A | (t3.2-t2.1)+(t9.5-t8) |
| TR2 | C | (t7.2-t5.3) |
| TR3 | A | (t5.2-t4.7)+(t15-t11.5) |
| TR3 | B | (t7.3-t6.6) |

Fig. 13

Round trip response time by transaction ID

| Transaction ID | earliest time | latest time | Response time |
|---|---|---|---|
| TR1 | t1 | t14 | (t14-t1) |
| TR2 | t2.1 | t9.5 | (t9.5-t2.1) |
| TR3 | t4.7 | t15 | (t15-t4.7) |

Fig. 14

Host data by transaction context (raw)

| Transaction Context | Reporting Host ID | Host Calling Relationship | start time | end time |
|---|---|---|---|---|
| CON1 | A | A/D | t1 | t2 |
| CON1 | D | D/E | t3 | t4 |
| CON1 | E | E/F | t5 | t6 |
| CON1 | F | F/E | t7 | t8 |
| CON1 | E | E/D | t9 | t10 |
| CON1 | D | D/A | t11 | t12 |
| CON1 | A |  | t13 | t14 |
|  |  |  |  |  |
| CON2 | A | A/C | t2.1 | t3.2 |
| CON2 | C | C/A | t5.3 | t7.2 |
| CON2 | A |  | t8 | t9.5 |
|  |  |  |  |  |
| CON3 | A | A/B | t4.7 | t5.2 |
| CON3 | B | B/A | t6.6 | t7.3 |
| CON3 | A |  | t11.5 | t15 |

Fig. 15

Round trip response time by transaction context

| Transaction context | earliest time | latest time | Response time |
|---|---|---|---|
| CON1 | t1 | t14 | (t14-t1) |
| CON2 | t2.1 | t9.5 | (t9.5-t2.1) |
| CON3 | t4.7 | t15 | (t15-t4.7) |

Fig. 16

Host A component data by transaction context (raw)

| Transaction Context | Calling Relationship | time |
|---|---|---|
| CON4 | C1 start | $t_A11.1$ |
| CON4 | C1/C1A | $t_A13.8$ |
| CON4 | C1A/C1 | $t_A17.2$ |
| CON4 | C1 end | $t_A20$ |
| | | |
| CON5 | C1 start | $t_A1$ |
| CON5 | C1/C1A | $t_A2$ |
| CON5 | C1A/C1 | $t_A3$ |
| CON5 | C1/C2 | $t_A4$ |
| CON5 | C2/C3 | $t_A5$ |
| CON5 | C3/C3A | $t_A6$ |
| CON5 | C3A/C3 | $t_A7$ |
| CON5 | C3/C4 | $t_A8$ |
| CON5 | C4/C5 | $t_A9$ |
| CON5 | C5/C5A | $t_A10$ |
| CON5 | C5A/C5 | $t_A11$ |
| CON5 | C5/C4 | $t_A12$ |
| CON5 | C4/C3 | $t_A13$ |
| CON5 | C3/C2 | $t_A14$ |
| CON5 | C2/C1 | $t_A15$ |
| CON5 | C1/C6 | $t_A16$ |
| CON5 | C6/C1 | $t_A17$ |
| CON5 | C1 end | $t_A18$ |

Fig. 17

Host A component data by transaction context (elapsed)

| Transaction Context | Component | elapsed time |
|---|---|---|
| CON4 | C1 | $t_A20-t_A11.1$ |
| CON4 | C1A | $t_A17.2-t_A13.8$ |
| | | |
| CON5 | C1 | $t_A18-t_A1$ |
| CON5 | C1A | $t_A3-t_A2$ |
| CON5 | C2 | $t_A15-t_A4$ |
| CON5 | C3 | $t_A14-t_A5$ |
| CON5 | C3A | $t_A7-t_A6$ |
| CON5 | C4 | $t_A13-t_A8$ |
| CON5 | C5 | $t_A12-t_A9$ |
| CON5 | C5A | $t_A11-t_A10$ |
| CON5 | C6 | $t_A17-t_A16$ |

Fig. 18

Response time by transaction context

| Transaction context | earliest time | latest time | Response time |
|---|---|---|---|
| CON4 | $t_A 11.1$ | $t_A 20$ | $(t_A 20 - t_A 11.1)$ |
| CON5 | $t_A 1$ | $t_A 18$ | $(t_A 18 - t_A 1)$ |

User interface

The following transaction data is out of range:    1910

| Transaction | response time | Baseline response time +/-deviation |
|---|---|---|
| TR1 | 1.5 sec. | 0.0-1.0 sec. |

The following host data is out of range:    1920

| Transaction | Host | response time | Baseline response time +/- deviation |
|---|---|---|---|
| TR1 | A | 1.0 sec. | 0.0-0.5 sec. |

The following component data is out of range:    1930

| Transaction | Host | component | response time | Baseline response time +/-deviation |
|---|---|---|---|---|
| TR1 | A | C1A | 0.3 sec. | 0.0-0.2 sec. |

AUTOMATIC ROOT CAUSE ANALYSIS OF PERFORMANCE PROBLEMS USING AUTO-BASELINING ON AGGREGATED PERFORMANCE METRICS

CROSS-REFERENCE TO RELATED APPLICATIONS

This application is related to commonly assigned U.S. pat. application Ser. No. 11/559,755, filed Nov. 14, 2006 (published as US2008/0126413 on May 29, 2008), titled "Baselining Backend Component Error Rate To Determine Application Performance," and U.S. pat. application Ser. No. 11/559,750, filed Nov. 14, 2006 (published as US2008/0109684 on May 8, 2008), titled "Baselining Backend Component Response Time To Determine Application Performance," each of which is incorporated herein by reference, and to U.S. pat. application Ser. No. 11/758,232, filed Jun. 5, 2007 (published as US2008/0306711 on Dec. 11, 2008) titled "Programmatic Root Cause Analysis For Application Performance Management,".

BACKGROUND OF THE INVENTION

Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

However, in complex distributed systems, it is often difficult to diagnose the root cause of a performance problem. For example, modern applications such as web applications can involve many different subsystems, such as web servers, application servers, identity management servers, database servers, messaging servers, and transaction processing servers. Accordingly, identifying which subsystem or subsystems are responsible for a performance problem can be difficult, requiring manual analysis by an administrator.

SUMMARY OF THE INVENTION

The present invention addresses the above and other issues by providing a system and method for automatically detecting anomalous behavior in a distributed system.

In one embodiment, a computer-implemented method for detecting anomalous behavior in a distributed system includes receiving data from different subsystems, such as hosts, in the distributed system which identifies metrics for the subsystems when the subsystems perform processing for different execution paths in the distributed system, and automatically establishing baseline metrics for the subsystems, responsive to the received data. The method further includes receiving data from particular subsystems which identifies metrics for the particular subsystems when they perform processing for a particular execution path in the distributed system, determining if the metrics for the particular subsystems are anomalous based on the baseline metrics, and reporting, responsive to the determining. For example, results may be reported via a user interface display. The metrics can include response time, error count or CPU load, for instance.

In one approach, the metrics for the particular subsystems are determined to be anomalous based on comparisons using the baseline metrics and associated deviation ranges, which can be automatically established.

Further, the baseline metrics can be automatically updated periodically when the data is received from the subsystems periodically.

The data from the subsystems can include identifiers of the execution paths and/or information identifying calling relationships among the particular subsystems.

The method may further include accessing metrics for components of one or more of the particular subsystems for which the metrics are determined to anomalous, determining if one or more of the metrics for the components is anomalous, and reporting, responsive to the determining if the one or more of the metrics for the components is anomalous. The accessed metrics can include information identifying calling relationships among the components. Further, the determining if the one or more of the metrics for the components is anomalous can be based on baseline metrics for the components which are automatically established responsive to data received from the one or more of the particular subsystems. Thus, once an anomalous subsystem is identified, a drill down procedure can be used to identify one or more anomalous components at the anomalous subsystem. Similarly, a drill down procedure can be used to identify one or more anomalous processes and/or applications.

In another embodiment, a computer-implemented method for detecting anomalous behavior at a host includes providing metrics for different components of the host, automatically establishing baseline metrics for the components based on the provided metrics, and providing metrics for particular components of the host which are in a particular execution path. The method further includes determining if the metrics for the particular components are anomalous based on the baseline metrics, and reporting, responsive to the determining.

In other embodiments, at least one processor readable storage device having processor readable code embodied thereon may be provided for programming at least one processor to perform the above-mentioned methods.

BRIEF DESCRIPTION OF THE DRAWINGS

FIG. 3b depicts an example execution path for a first transaction based on FIG. 3a.

FIG. 4 depicts a process by which different hosts provide response time data, based on the time line of FIG. 3.

FIG. 6b depicts an example execution path for a fourth transaction based on FIG. 6a.

FIG. 7b depicts an execution path for a fifth transaction based on FIG. 7a.

FIG. 8 depicts a process by which a host provides response time data, based on FIGS. 7a and 7b.

FIG. 9 depicts a process for automatically generating metrics and deviation ranges for transactions.

FIG. 10a depicts a procedure for identifying transactions, subsystems and components whose metrics are out-of-range.

FIG. 10b depicts a procedure for identifying transactions and components at a subsystem whose metrics are out-of-range.

FIG. 11a depicts raw host response time data indexed by transaction identifier, based on FIGS. 3b-3d.

FIG. 11b depicts host error data.

FIG. 11c depicts host CPU load data.

FIG. 12 depicts elapsed processing times indexed by transaction identifier, based on FIG. 11a.

FIG. 13 depicts round trip response times indexed by transaction identifier, based on FIG. 11a.

FIG. 14 depicts raw host data indexed by transaction context, based on FIGS. 3b-3d.

FIG. 15 depicts round trip response times indexed by transaction context, based on FIG. 14.

FIG. 16 depicts raw component data indexed by transaction context, based on FIGS. 6a and 7a.

FIG. 17 depicts elapsed processing times indexed by transaction context identifier, based on FIG. 16.

FIG. 18 depicts response times indexed by transaction context, based on FIG. 16.

FIG. 19 depicts an example user interface showing out-of-range transaction data, out-of-range host data for an out-of-range transaction and out-of-range component data for an out-of-range host.

DETAILED DESCRIPTION

The present invention provides a system and method for automatically detecting anomalous behavior in a distributed system.

Figure 1:
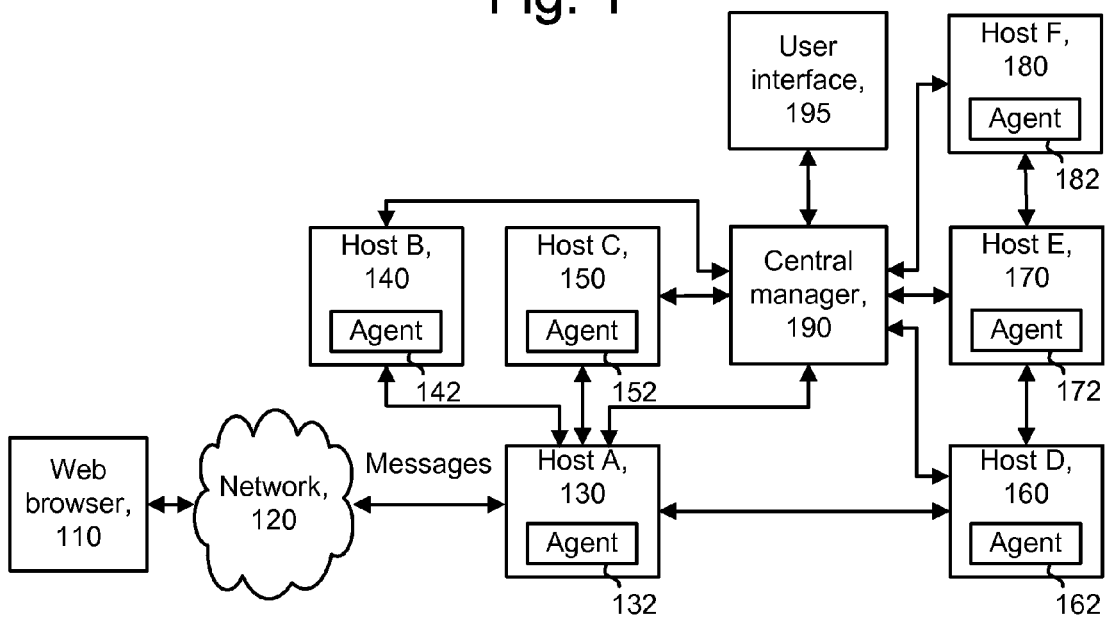
FIG. 1 depicts a system in which a number of hosts process requests from a client.

FIG. 1 depicts a system in which a number of hosts process requests from a client. The system is an example of a distributed system which includes subsystems such as host computers. A client such as a web browser 110, in response to user commands, exchanges messages with a host A 130, such as an application server, via a network 120 such as the Internet. The web browser 110 typically accesses the network 120 via an Internet Service Provider, not shown. While a single web browser is depicted, it is also possible for multiple web browsers or other clients, including automated clients such as other servers, to communicate messages to/from the host A 130 as well as other hosts. In the example, host A 130 communicates with a number of other hosts. For example, host A 130 can communicate with host B 140, host C 150 and/or host D 160. Host D 160, in turn, can communicate with host E 170 which, in turn, can communicate with host F 180. The hosts may be considered to be subsystems in the network where processing occurs. In one approach, hosts B-F are backend systems which host A communicates with via a local network, but they can be on any network including the Internet.

In practice, relatively complex topologies may be employed. In an enterprise application configuration, for example, typically clusters of application servers are set up at different geographic locations to serve a large population of users, while providing load balancing, backup protection and quick response times. Further, web applications can involve many different subsystems, such as web servers, application servers, identity management servers, database servers, messaging servers, and transaction processing servers. One or more hosts can be used to provide these subsystems and others.

In one possible approach, each host includes an agent which reports data to a central manager 190. For example, host A 130 includes agent 132, host B 140 includes agent 142, host C 150 includes agent 152, host D 160 includes agent 162, host E 170 includes agent 172 and host F 180 includes agent 182. The agents can report data such as data logs to the central manager periodically, for instance. The central manager 190 can process the data received from the agents to provide a report to an administrator via a user interface 195, for instance. As described further below, each host which is involved in processing a transaction can report metrics such as processing time data, error count and/or CPU load to the central manager. The central manager can be provided as a separate host or as part of one of the hosts depicted. A transaction can involve a request received from a client, for instance, when a user clicks on a link in a web browser. When a response is provided to the client, such as a requested web page, a transaction can include the request and the corresponding response.

The processing time data can indicate, e.g., the time that a request was received by a host, and the time that a response was transmitted by the host. Further, if the information is available, the start and stop times of different processes, such as components and/or applications, within a host, can be reported. In one possible approach, instrumentation is used to obtain the start and stop times of processes which are involved in a transaction. Error count data can indicate, e.g., a number of errors which are thrown by a process. Further, such data can classify the error data, e.g., according to type and/or severity. CPU load can indicate a portion of CPU resources which are being utilized at a host. In one possible approach, the operating system of a host samples the current state of a CPU (e.g., busy or not busy) at different points over a time interval to determine the portion of time the CPU is busy in that time interval. A utilization of between 0% and 100% can be reported, for instance.

Figure 2:
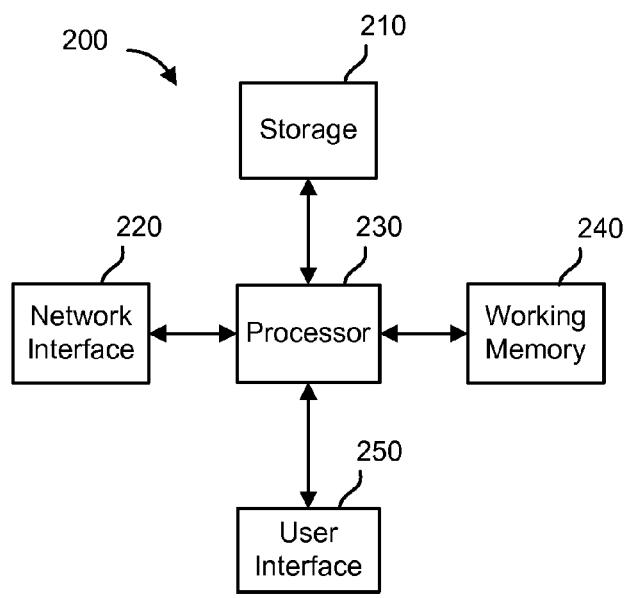
FIG. 2 depicts a computer system.

FIG. 2 depicts a computer system. The computer system 200 is a simplified representation of a system which might be used as a web browser, host and/or central manager, such as discussed in connection with FIG. 1. The computer system 200 includes a storage device 210 such as a hard disk or portable media, a network interface 220 for communicating with other computer systems, a processor 230 for executing software instructions, a working memory 240 such as RAM for storing the software instructions after they are loaded from the storage device 210, for instance, and a user interface display 250. The storage device 210 may be considered to be a processor readable storage device having processor readable code embodied thereon for programming the processor 230 to perform methods for providing the functionality discussed herein. The user interface display 250 can provide information to a human operator based on the data received from one or more agents. The user interface display 250 can use any known display scheme, whether graphical, tabular or the like. In addition to an on-screen display, an output such as a hard copy such from printer can be provided.

Further, the functionality described herein may be implemented using one or more processor readable storage devices having processor readable code embodied thereon for programming one or more processors. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

Figure 3A:
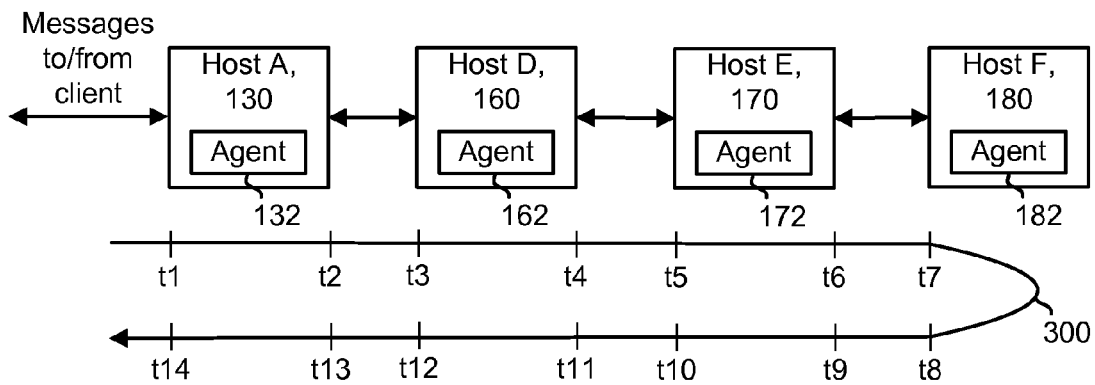
FIG. 3a depicts a time line of an execution path which extends across different hosts.

FIG. 3a depicts a time line of an execution path which extends across different hosts. An execution path can include, e.g., one or more hosts or other subsystems, and/or or more process, applications and/or components at one or more hosts, which are involved in executing software to process a request from a client. In one approach, the client sends a request to host A 130, which begins processing the request. As depicted by a time line 300, host A 130 receives the request at a time t1. At t2, host A 130 sends a request to host D 160, for instance, to obtain requested information which is not available at host A 130. Host D 160 receives the request at t3, which can differ from t2 due to a network transit time between host A and host D, for instance. Note that it is also possible to provide agents in the network links to report on network transit time. Host D 160 similarly sends a request to host E 170 at t4 to obtain additional information which is not available at host D 160. Host E 170 receives this request at t5. Host E 172 similarly sends a request to host F 180 at t6 to obtain additional information which is not available at host E 170. Host F 180 receives this request at t7. Host F 180 responds at t8, transmitting a response to host E 170, which is received at t9. Host E 170 responds at t10, transmitting a response to host D 160, which is received at t11. Host D 160 responds at t12, transmitting a response to host A 130, which is received at t13. Finally, host A 130 responds to the client, transmitting a response to the client at t14.

Each host can note the time at which a respective request is received and a respective response is transmitted to allow the response time at each host and the network transit time between hosts to be determined, as well as an overall response time from the perspective of host A in responding to the request from the client. For example, t14−t1 represents the overall, round trip response time, t2−t1 represents a processing time at host A and t3−t2 represents a network transit time between host A 130 and host D 160. Each host can be synchronized to a known time keeping standard and provide time stamps, for instance, at time points which are to be noted. It is also possible to use a browser response time tool or web server response time tool to obtain response time data.

Also, note that while FIG. 3a depicts hosts calling one another serially, it is also possible for hosts to call one another in parallel paths. For example, referring to FIG. 1, host A 130 could call host B 140 and host C 150 concurrently.

Figure 3B:
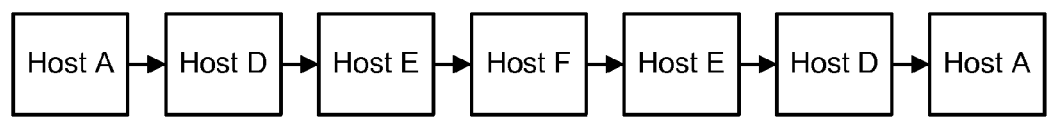
Figure 3C:
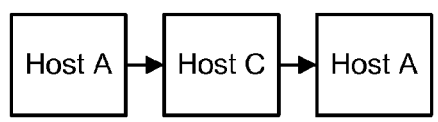
FIG. 3c depicts an example execution path for a second transaction.
Figure 3D:
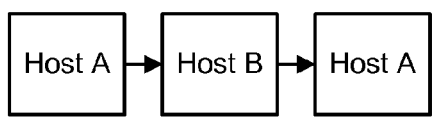
FIG. 3d depicts an example execution path for a third transaction.

FIG. 3b depicts an example execution path for a first transaction (TR1) based on FIG. 3a. The execution path 320 includes the sequence: host A, host D, host E, host F, host E, host D and host A. As mentioned, the central manager can construct the execution path based on information provided by the different hosts, in one possible approach. FIG. 3c depicts an example execution path for a second transaction (TR2). The execution path 340 includes the sequence: host A, host C and host A. FIG. 3d depicts an example execution path for a third transaction (TR3). The execution path 360 includes the sequence: host A, host B and host A. The execution paths of FIGS. 3b-3d are referred to further below in connection with FIGS. 11-15.

FIG. 4 depicts a process by which different hosts provide response time data, based on the time line of FIG. 3a. At step 400, host A receives a request from a client and notes the time, t1. At step 405, host A processes the request. At step 410, host A calls host D and notes the time, t2. At step 415, host D receives a request from host A and notes the time, t3. At step 420, host D process the request. At step 425, host D calls host E and notes the time, t4. At step 430, host E receives a request from host D and notes the time, t5. At step 435, host E processes the request. At step 440, host E calls host F and notes the time, t6. At step 445, host F receives a request from host E and notes the time, t7. At step 450, host F processes the request. At step 455, host F returns a response to host E and notes the time, t8. At step 460, host E receives the response from host F and notes the time, t9. At step 465, host E processes the response. At step 470, host E returns a response to host D and notes the time, t10. At step 475, host D receives the response from host E and notes the time, t11.

At step 480, host D processes the response. At step 485, host D returns a response to host A and notes the time, t12. At step 490, host A receives the response from host D and notes the time, t13. At step 492, host A processes the response. At step 494, host A returns a response to the client and notes the time, t14. At step 496, the hosts periodically report time and transaction data to the central manager. As described further below, transaction data can be used to associate time data with a given transaction. For example, transaction data can include a transaction identifier, e.g., a number, which is generated by host A when a new request is received from a client. Host A can transmit the transaction identifier in its request to host D, and the transaction identifier can be propagated in each subsequent request and response, e.g., in the header of message packets sent between the hosts. The agents at each host see the transaction identifier and include it when reporting time data to the central manager. In another approach, the transaction data includes a calling relationship among the hosts. For example, host A knows that it calls host D and that host D returns a response, even if host A does not know how host D obtains the response by calling other hosts. For instance, host A may know that a particular request that was sent out to a particular host which is a database server by tracing a JDBC connector to see a connection/socket open to the particular host. Host A can therefore report that it has called host D and received a response from host D at certain times. The calling relationship can be augmented by transaction context data to correlate time data with a transaction. Transaction context data can include, e.g., a URL, user id and/or HTTP parameters which are associated with a transaction. Further, when identifying time data of processes, applications and/or components at a host, a calling relationship of the processes, applications and/or components can be used along with transaction context data to correlate time data with a transaction.

Figure 5:
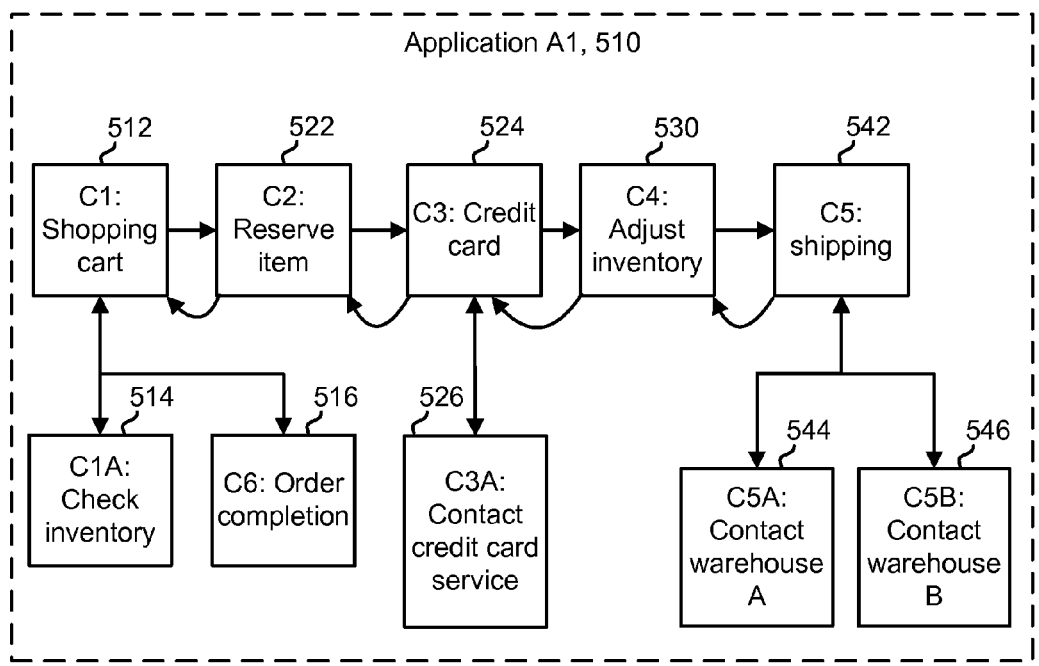
FIG. 5 depicts calling relationships of components in an execution path.

FIG. 5 depicts calling relationships of components in an execution path. Components are depicted in an application A1 510 which may run on an application server such as host A 130 of FIG. 1. The sequence of components provided herein is an example of one possible type of execution path.

Each component which is invoked can be considered part of an execution path. Note that, when an application is instrumented, typically only selected components are instrumented based on the developer's understanding of the application and selection of components which are expected to be of interest. Thus, many components which are not deemed to be of interest may be invoked in an application, but are not included in execution paths.

Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE, which can employ components such as a Java Server Page, an Enterprise Java Bean, a servlet, and a Java Database Connectivity component. However, other component oriented programming models may also be used, such as those using Microsoft .NET components. Moreover, the programming model need not be object oriented.

The specific example shown refers to a web-based e-commerce application which allows users to order items. The components correspond to business logic or e-commerce steps in the application. In particular, a component C1 512 provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. C1 512 calls a component C1A 514 to check an inventory to determine if the selected item is in stock. Once it is determined that the selected item is in stock, C1 512 calls a component C2 522, which reserves the item so that it will not be sold to another user while the transaction is still pending. Once finished, C2 522 calls a component C3 524, which checks the user's credit card information to authorize and validate the purchase. This typically involves communicating with an external server that is managed by a credit card clearinghouse. For example, C3 524 can call a component C3A 526 which contacts a credit card service.

Once C3 524 successfully finishes, thereby approving the purchase, it calls a component C4 530 which adjusts an inventory by decrementing the quantity of the item which is purchased. C4 530 calls a component C5 542 which arranges for the item to be shipped, such as by contacting a warehouse, where a shipping label is printed and an operator is prompted to manually locate and pack the item. For example, C5 542 can call a component C5A 544, which contacts a warehouse A, and/or a component C5B 546, which contacts a warehouse B.

Once the components C2-C5 have executed, the execution path returns to C1 512, which calls an order completion component C6 516 to confirm the purchase to the user such as by providing an order confirmation number and a tracking number, e.g., in a confirmation e-mail or web page. The execution path can similarly return to C1 512 if the inventory is out of stock at C1A 514 or the credit card payment is unsuccessful at C3 524. In one possible implementation, C1 and C6 are Java Server Pages and C2-C5 are Enterprise Java-Beans.

Note that a first component can continue executing after calling another component, which begins executing, in an asynchronous, multi-thread or multi-process mode, or can temporarily pause until the called component has finished executing, in a synchronous, single-thread or single-process mode. For example, C1 512 can pause while the components C2-C5 execute. Moreover, a given component may be invoked more than once during a transaction. For example, assume the user has purchased multiple items that are stored at different warehouses. In this case, C5 542 may execute repeatedly, contacting a different warehouse and/or warehouse department for each item.

Figure 6A:
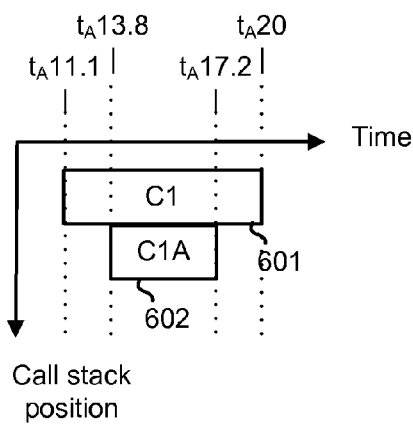
FIG. 6a depicts a call stack position vs. time graph based on FIG. 5.

FIG. 6*a* depicts a call stack position vs. time graph based on FIG. 5. The representation is an example of the type of execution path information provided by one or more hosts. The execution path information can identify which components of an application are invoked and the time in which they are invoked. The horizontal direction represents time, while the vertical direction indicates call stack depth or position. A call stack identifies components which have been called or invoked during the execution of one or more programs or threads. In the graphical representation, which can be provided on a user interface display, for instance, C1 601 is the first or root component of the call stack and C1A 602 is at a second layer of the call stack.

This simplified example corresponds to the situation where the execution path begins at the shopping cart component C1, which calls the check inventory component C1A, but the requested item is out of stock. In this case, C1A terminates and the execution path returns to C1. Specifically, C1 starts executing at a randomly chosen time $t_A11.1$, C1 calls C1A at $t_A13.8$, C1A ends at $t_A17.2$ and C1 ends at $t_A20$. The subscript "A" denotes that the components execute at host A. This example is referenced further below in connection with FIGS. 16-18.

Figure 6B:
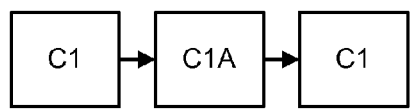

FIG. 6*b* depicts an example execution path for a fourth transaction based on FIG. 6*a*. This fourth transaction execution path 650 includes the sequence: C1, C1A and C1.

Figure 7A:
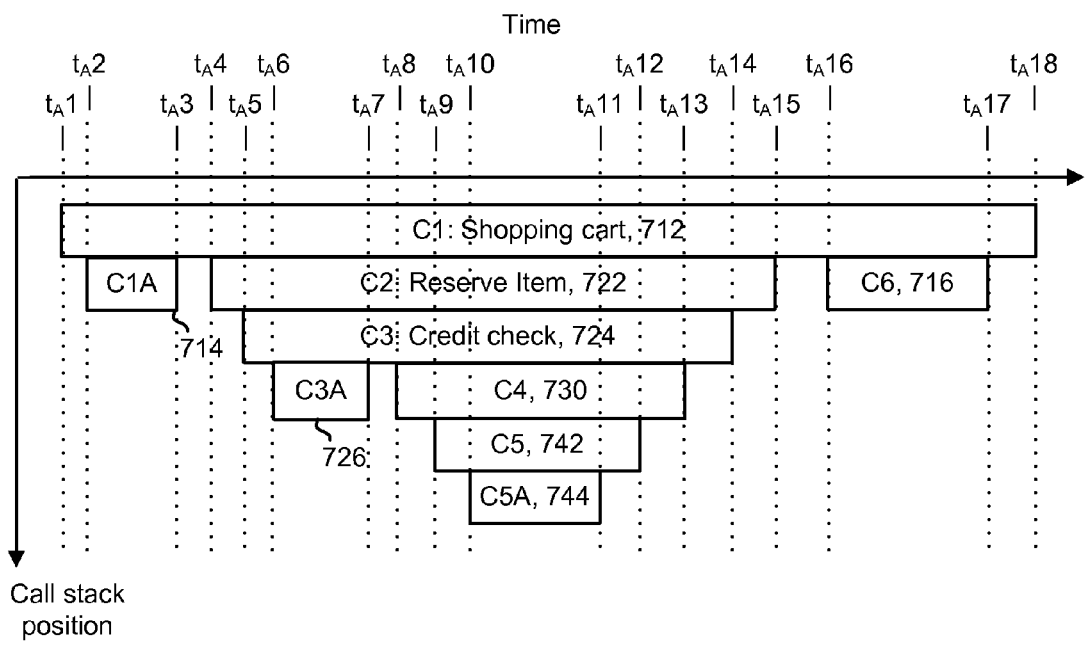
FIG. 7a depicts a call stack position vs. time graph based on FIG. 5.

FIG. 7*a* depicts a call stack position vs. time graph based on FIG. 5. The subscript "A" denotes that the components execute at host A. Note that units of time are not provided but an execution path will typically extend for a fraction of a second to a few seconds. The graph is explained further in connection with FIG. 8.

Figure 7B:
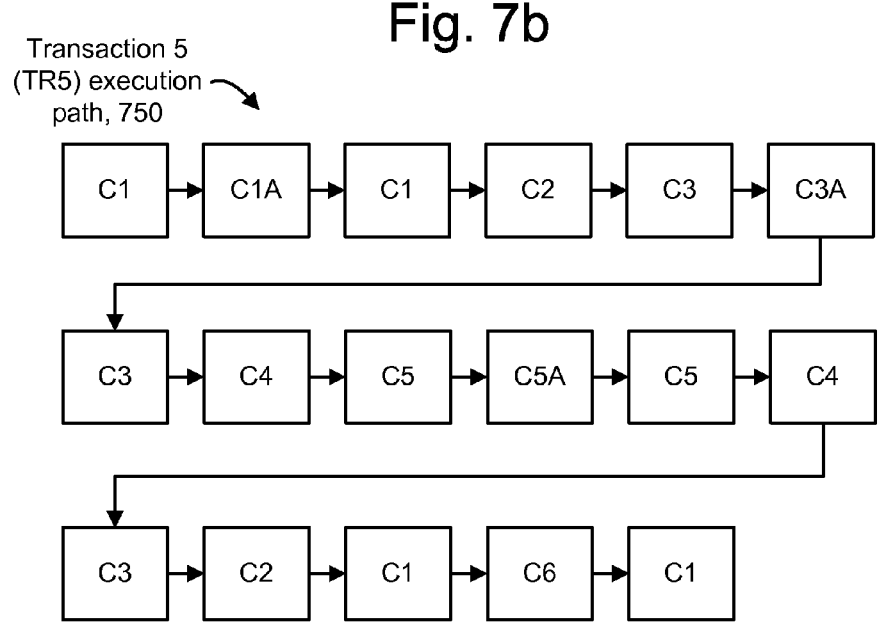

FIG. 7*b* depicts an execution path for a fifth transaction based on FIG. 7*a*. The execution path 750 includes the sequence: C1, C1A, C1, C2, C3, C3A, C3, C4, C5, C5A, C5, C4, C3, C2, C1, C6 and C1.

FIG. 8 depicts a process by which a host provides response time data, based on FIGS. 7*a* and 7*b*. At step 800, host A receives a request from a client and notes when C1 begins executing at $t_A1$. At step 805, C1 calls C1A at $t_A2$ and the time is noted. At step 810, C1A completes executing at $t_A3$ and the time is noted. At step 815, C1 calls C2 at $t_A4$ and the time is noted. At step 820, C2 calls C3 at $t_A5$ and the time is noted. At step 825, C3 calls C3A at $t_A6$ and the time is noted. At step 830, C3A completes executing at $t_A7$ and the time is noted. At step 835, C3 calls C4 at $t_A8$ and the time is noted. At step 840, C4 calls C5 at $t_A9$ and the time is noted. At step 845, C5 calls C5A at $t_A10$ and the time is noted. At step 850, C5A completes executing at $t_A11$ and the time is noted. At step 855, C5 completes executing at $t_A12$ and the time is noted. At step 860, C4 completes executing at $t_A13$ and the time is noted. At step 865, C3 completes executing at $t_A14$ and the time is noted. At step 870, C2 completes executing at $t_A15$ and the time is noted. At step 875, C1 calls C6 at $t_A16$ and the time is noted. At step 880, C6 completes executing at $t_A17$ and the time is noted. At step 885, host A provides a response to the client, at which time C1 completes executing, at $t_A18$, and the time is noted. At step 890, host A periodically reports time and transaction data to the central manager.

FIG. 9 depicts a process for automatically generating baseline metrics and deviation ranges for transactions. Baseline metrics such as response times, error counts and/or CPU loads, and associated deviation ranges can be automatically generated and updated periodically. In some cases, the metrics can be correlated with transactions as well. Further, the baseline metrics and deviations ranges can be established for an entire transaction, e.g., as a round trip response time, as well as for portions of a transaction, whether the transaction involves one or more hosts and one or more processes at the one or more hosts. In some cases, a deviation range is not needed, e.g., when the baseline metric is a do not exceed level. For example, only response times, error counts or CPU loads which exceed a baseline value may be considered to be anomalous. In other cases, only response times, error counts or CPU loads which are below a baseline value are considered to be anomalous. In yet other cases, response times, error counts or CPU loads which are either too low or too high are considered to be anomalous.

In one possible approach, depicted at step 900, initial transaction data and metrics are received from agents at the hosts. For example, this information may be received by the central manager over a period of time which is used to establish the baseline metrics. In another possible approach, initial baseline metrics are set, e.g., based on a prior value of the metric or an administrator input, and subsequently periodically updated automatically. At step 905, the metrics can be correlated with the transactions, although this is not always necessary. At step 910, initial baseline metrics and deviation ranges are established for the transactions. The deviation range can be set as a function of the response time, error count or CPU load, for instance, e.g., as a percentage, a standard deviation, or so forth. Further, the deviation range can extend above and/or below the baseline level. As an example, a baseline response time for a transaction may be 1 sec. and the deviation range may be +/−0.2 sec. Thus, a response time in the range of 0.8-1.2 sec, would be considered normal, while a response time outside the range would be considered anomalous.

At step 915, initial baseline metrics and deviation ranges are established for individual hosts. At step 920, initial baseline metrics and deviation ranges are established for processes, such as components and/or applications, at the hosts. At step 925, additional transaction data and metrics are received from the agents. For example, this may occur periodically or based on other factors. The hosts may provide the data to the central manager based on their own initiative or in response to a query from the central manager. At step 930, the additional metrics are correlated with the transactions. At step 935, the baseline metrics and deviation ranges are updated. This automatic updating of the baseline metrics and deviation ranges advantageously does not require an administrator input. Note that the baseline metrics and deviation ranges can be determined and updated using different techniques. For example, a running average over a period of time such as hours or days can be used. Further, the baseline metrics and deviation ranges can be determined based on factors such as time of day, day of week and so forth. For instance, a peak hours baseline metric and deviation range which applies, e.g., during normal business hours, can be determined along with an off-peak baseline metric and deviation range which applies, e.g., at night or on weekends. Different time periods may be weighted differently as well.

FIG. 10*a* depicts a procedure for identifying transactions, subsystems and components whose metrics are out-of-range. The procedure of FIG. 10*a* can occur at least partly in parallel with the process of FIG. 9, for instance, after the initial baseline metrics and deviation ranges are established at steps 900-920. At step 1000, transaction data and metrics are received from the agents, in one possible approach, by the central manager. At step 1005, the metrics are correlated with the transactions, although this is not always necessary. At step 1010, the metrics for the transactions can be processed, e.g., to obtain a round-trip response time. At decision block 1015, if all metrics are within an acceptable range, e.g., the range determined by the baseline metrics and the deviation ranges, then the process loops back to step 1000 to receive additional transaction data and metrics. If the metrics for one or more transactions are out-of-range at decision block 1015, the subsystems which are involved in the out-of-range transactions are identified at step 1020 and metrics can be processed for them at step 1025. At step 1030, one or more specific subsystems for which the metrics are out-of-range are identified. For example, a response time of a specific host may be out of its established range. At step 1035, one or more components of the out-of-range subsystems are identified and their metrics can be processed at step 1040. For example, a response time of a specific component may be out of its established range. At step 1045, one or more specific components for which the metrics are out-of-range are identified. Finally, at step 1050, results are reported, e.g., by outputting data to a file, setting an alarm, communicating a page or e-mail to an administrator and/or providing a user interface display.

The approach described therefore can involve a drill down or hierarchical process in which additional metrics are processed only as needed for transactions, subsystems and/or components which are found to be out-of-range. That is, metrics for subsystems and components need not be examined unless an out-of-range transaction is detected. This approach is efficient in that it avoids unnecessary calculations and processing. Note also that the process of FIG. 10*a* could be modified to detect a subsystems or component whose metrics are out-of-range even if the transaction metrics, such as round trip response time, are acceptable. Similarly, a component whose metrics are out-of-range can be detected even if the associated host's metrics are acceptable. In these cases, the subsystem and/or components are examined even if the overall transaction metrics are normal.

Further, various drill down scenarios can be provided if a hierarchy is defined in which a distributed application is the highest level (level 1), one or more subsystems are at a next level (level 2), one or more processes are at a next level (level 3), one or more applications are at a next level (level 4) and one or more components are at a next level (level 5). For example, drill down sequences can include: a) level 1 to level 2 to level 3 to level 4 to level 5. That is, first look at metrics for the distributed application to determine if there is an anomaly. If there is such an anomaly, look at metrics for the subsystems to determine if there is an anomaly. For any subsystem with an anomaly, look at its processes to determine if there is an anomaly. For any process with an anomaly, look at its applications to determine if there is an anomaly. For any application with an anomaly, look at its components to determine if there is an anomaly. Finally, report the results. Other example drill down sequences include: b) level 1 to level 2 to level 3 to level 4, c) level 1 to level 2 to level 4 to level 5 and d) level 1 to level 2 to level 5, and so forth. Various other sequences and modifications will be apparent to those skilled in the art.

FIG. 10*b* depicts a procedure for identifying transactions and components at a host whose metrics are out-of-range. In a single host embodiment, there is no need to identify one or more out-of-range subsystems in a group of subsystems. Instead, metrics for the components at the subsystem can be analyzed directly to determine which components are out-of-range. Steps 1060-1075 correspond to steps 1000-1015, respectively, in FIG. 10*a*, and steps 1080-1095 correspond to steps 1035-1050, respectively, in FIG. 10*a*. At step 1060, transaction data and metrics are received from the agent at the subsystem, in one possible approach, by the central manager. Or, the transaction data and metrics can be processed locally at the subsystem. At step 1065, the metrics are correlated with the transactions, although this is not always necessary. At step 1070, the metrics for the transactions can be processed, e.g., to obtain a round-trip response time at the subsystem. At decision block 1075, if all metrics are within an acceptable range, e.g., the range determined by the baseline metrics and the deviation ranges, then the process loops back to step 1060 to receive additional transaction data and metrics. If the metrics for one or more transactions are out-of-range at decision block 1075, one or more components of the one or more out-of-range subsystems are identified at step 1080 and their metrics can be processed at step 1085. For example, a response time of a specific component may be out of its established range. At step 1090 one or more specific components for which the metrics are out-of-range are identified. Finally, at step 1095, results are reported, as discussed previously.

FIG. 11*a* depicts raw host response time data indexed by transaction identifier, based on FIGS. 3*b*-3*d*. As mentioned, transaction data can be used to associate time data with a given transaction. For example, transaction data can include a transaction identifier, e.g., a number, which is generated by a host when a new request is received from a client. The host can transmit the transaction identifier in its requests to other hosts, and the transaction identifier can be propagated in each subsequent request and response, e.g., in the header of message packets sent between hosts. The agents at each host see the transaction identifier and include it when reporting time data to the central manager.

The data which is reported by the hosts or other subsystems can include the transaction identifier (ID), an identifier of the host, such as a network address, a start time at which the host begins processing for a transaction, and an end time at which the host concludes processing for a transaction. Such data can be reported in a log file from the hosts, for instance. For transaction 1 (TR1), this example provides the start and end times based on the first execution path 320 of FIGS. 3*a* and 3*b*. For transaction 2 (TR2), the start and end times are based on the second execution path 340 of FIG. 3*c*. For transaction 3 (TR3), the start and end times are based on the third execution path 360 of FIG. 3*d*. For TR2 and TR3, the start and end times are shown as being interspersed among the start and end times of TR1 since multiple transactions can occur in parallel. For example, for TR2, the start time of t2.1 for host A occurs just after the end time t2 for host A in TR1, and the end time of t9.5 for host A occurs between the start and end times of t9 and t10, respectively, in TR1 for host E.

The data which is reported by the hosts can also include an error count and/or CPU load for a specified time period or for specified time points. Note also that network transit time can be determined from the information provided. For example, in FIG. 11*a*, t3–t2 is the transmit time between host A and host D. In this manner, latency in a network segment can also be monitored and tracked. A baseline network transit time can be determined and an alarm set when a subsequent transmit time is out-of-range.

FIG. 11*b* depicts host error data. Errors are thrown for a variety of reasons. For example, a database server may throw an error when it cannot fulfill a request. The error is typically communicated to the requesting entity in a response message. A host can report an error count for all components and/or for specific components at the host. In one approach, the host calculates a total error count for a specified time period and reports that total, while in another approach, the host reports individual errors and the time each error was thrown, and the central manager calculates the total error count for a specified time period. The central manager can calculate the error count for a time period which is correlated with a transaction, for instance. Further, the host can report the time each error was thrown along with transaction context information, such as a transaction identifier, so that an error count can be calculated and directly correlated with a transaction.

In the example provided, the host error data indicates that at time t3.5, while TR1 was executing, host D threw an error having an identifier of E200. Also, at time t5.5, while TR1 was executing, host E threw an error having an identifier of E400. At time t14, while TR3 was executing, host A threw an error having an identifier of E300. Thus, the number of errors thrown by a host and/or for a transaction can be determined.

FIG. 11*c* depicts host CPU load data. A host can report a CPU load for the host overall and/or while specific processes execute at the host. In one approach, the host calculates a CPU load for a specified time period and reports that value, while in another approach, the host reports the time each CPU reading was taken and the result (busy or not busy), and the central manager calculates the CPU load for a specified time period. The central manager can correlate the CPU load for a time period with a transaction, for instance. Further, the host can report the time each CPU load calculation was made or reading was taken, along with transaction context information, such as a transaction identifier, so that a CPU load can be directly correlated with a transaction.

In the example provided, the CPU load for host A is indicated. The CPU load for other hosts can similarly be reported to the central manager. Moreover, the reporting schedule can be the same or different among the hosts. In one approach, host A reports the CPU load every fifty time units, e.g., at t0, t50, t100, t150, etc. Further, the load value given represents the average load over the previous fifty time units. Thus 75% is the CPU load between t0 and t50, 50% is the CPU load between t51 and t100 and 25% is the CPU load between t101 and t150. Various other approaches are possible. The other hosts can similarly report a CPU load. When a host has multiple CPUs, an overall load value can be reported using an appropriate averaging or weighting scheme and/or the load for each CPU can be reported individually. Other criteria such as CPU frequency can also be factored into the load value.

FIG. 12 depicts elapsed processing times indexed by transaction identifier, based on FIG. 11*a*. The central manager or other entity can process the raw data depicted in FIG. 11*a* to obtain elapsed processing times for the different hosts which are involved in the different transactions. For example, for TR1, the elapsed processing time for host A is (t2–t1)+(t14–t13) since host A has a first processing time which starts at t1 and ends at t2 and a second processing time which starts at t13 and ends at t14. Also, for TR1, the elapsed processing time for host F is (t8–t7) since host F only has one processing time which starts at t7 and ends at t8. The elapsed processing times for the other hosts involved in TR1, and the hosts involved in TR2 and TR3, are determined similarly.

FIG. 13 depicts round trip response times indexed by transaction identifier, based on FIG. 11*a*. The central manager or other entity can process the data depicted in FIG. 11*a* to obtain a total or round-trip response time for the different transactions based on the earliest start time and the latest end time. For example, for TR1, the earliest start time is t1 and the latest end time is t14, so the round trip response time is (t14−t1). The round trip response times for TR2 and TR3 are determined similarly.

FIG. 14 depicts raw host data indexed by transaction context, based on FIGS. 3b-3d. In another approach which does not necessarily use a transaction identifier, the time data reported by the agents is correlated using a calling relationship among the hosts and/or transaction context data. As mentioned, a calling relationship among hosts can be augmented by transaction context data to correlate time data with a transaction. Transaction context data can include, e.g., a URL, user id and/or HTTP parameters which are associated with a transaction. CON1 denotes the transaction context for the first transaction of FIG. 3b, CON2 denotes the transaction context for the second transaction of FIG. 3c and CON3 denotes the transaction context for the third transaction of FIG. 3d. The reporting host ID is an identifier of the host providing the information in a given row of the table.

For example, the first row indicates that CON1 is the transaction context, host A is the reporting host, A/D, or A calls D, is the calling relationship, t1 is the start time at which host A begins processing for the transaction and t2 is the end time at which host A stops processing for the transaction and calls host D. Each host knows which other hosts it calls and receives a response from. The second row indicates that D/E, or D calls E, is the calling relationship, t3 is the start time at which host D begins processing for the transaction and t4 is the end time at which host D stops processing for the transaction and calls host E. The third row indicates that E/F, or E calls F, is the calling relationship, t5 is the start time at which host E begins processing for the transaction and t6 is the end time at which host E stops processing for the transaction and calls host F. The fourth row indicates that F/E, or F responds to E, is the calling relationship, t7 is the start time at which host F begins processing for the transaction and t8 is the end time at which host F stops processing for the transaction and returns a response to host E. The fifth row indicates that E/D, or E responds to D, is the calling relationship, t9 is the start time at which host E begins processing for the transaction and t10 is the end time at which host E stops processing for the transaction and returns a response to host D. The sixth row indicates that D/A, or D responds to A, is the calling relationship, t11 is the start time at which host D begins processing for the transaction and t12 is the end time at which host D stops processing for the transaction and returns a response to host A. The seventh row indicates that host A begins processing at t13 and ends processing at t14, such as by providing a response to the client. There is no calling relationship at this point.

The entries for the second and third transaction contexts CON2 and CON3, respectively, can be interpreted similarly.

FIG. 15 depicts response times indexed by transaction context, based on FIG. 14. The central manager or other entity can process the data depicted in FIG. 14 to obtain a total or round-trip response time for the different transactions based on the earliest start time and the latest end time for each transaction context. For example, for CON1, the earliest start time is t1 and the latest end time is t14, so the round trip response time is (t14−t1). The round trip response times for CON2 and CON3 are determined similarly as (t9.5−t2.1) and (t15−t4.7), respectively.

FIG. 16 depicts raw component data indexed by transaction context, based on FIGS. 6a and 7a. Components execute at a host or other subsystem, and can include abstract software modules, e.g., Enterprise Java Beans (EJBs) or plain Java objects. When time data indicating when components are called is available, e.g., via instrumentation or other means, it can be used to determine processing times for the components. Processing times for other processes such as applications, which can be comprised of a group of components, for instance, can similarly be determined. One approach uses a calling relationship among components to correlate time data with a specific transaction context, analogous to the way in which a calling relationship among hosts is used (FIG. 14) to correlate time data with a specific transaction context. Thus, the processing time for an entire application, not just its components, can be calculated, e.g., by looking at the roundtrip response time of the "front" components.

Here, CON4 denotes the transaction context for the fourth transaction of FIGS. 6a and 6b and CON5 denotes the transaction context for the fifth transaction of FIGS. 7a and 7b. The first four rows indicate that component C1 starts executing at $t_A11.1$, C1 calls C1A at $t_A13.8$, C1A returns a response to C1 at $t_A17.2$ and C1 ends execution at $t_A20$. As mentioned, $t_A$ denotes a time which is kept by host A. The other rows contain analogous information for CON5. For example, C1 starts executing at $t_A1$, C1 calls C1A at $t_A2$, C1A returns a response to C1 at $t_A3$, C1 calls C2 at $t_A4$, C2 calls C3 at $t_A5$, C3 calls C3A at $t_A6$, C3A returns a response to C3 at $t_A7$, C3 calls C4 at $t_A8$, C4 calls C5 at $t_A9$, C5 calls C5A at $t_A10$, C5A returns a response to C5 at $t_A11$, C5 returns a response to C4 at $t_A12$, C4 returns a response to C3 at $t_A13$, C3 returns a response to C2 at $t_A14$, C2 returns a response to C1 at $t_A15$, C1 calls C6 at $t_A16$, C6 returns a response to C1 at $t_A17$ and C1 stops executing at $t_A18$.

Note that component data such as provided by host A can also be provided by other hosts involved in the same or different transactions to allow determination of component response times at those other hosts. Further, application and/or process data can be provided where a process includes one or more applications and an application includes one or more components. Calling relationships among applications and/or processes can be provided in a manner similar to the calling relationships for components.

FIG. 17 depicts elapsed processing times indexed by transaction context, based on FIG. 16. The central manager or other entity can process the data depicted in FIG. 16 to obtain elapsed processing times for the different components at host A which are involved in the different transaction contexts. For example, for CON4, the elapsed processing time for C1 is $t_A20-t_A11.1$ since the earliest start time for C1 is $t_A11.1$ and the latest end time for C1 is $t_A20$. Similarly, the elapsed processing time for C1A is $t_A17.2-t_A13.8$ since the earliest start time for C1A is $t_A13.8$ and the latest end time for C1A is $t_A17.2$. The elapsed processing times for the components of CON5 can be determined similarly as indicated. In some cases, a component may be called multiple times, in which case the elapsed time for each call can be determined.

FIG. 18 depicts response times indexed by transaction context, based on FIG. 16. Here, the elapsed processing time at a host is determined based on the difference between the earliest start time of a component and the latest end time. For example, the first row indicates that, for CON4, the response time at host A is $(t_A20-t_A11.1)$, and the second row indicates that, for CON5, the response time at host A is $(t_A18-t_A1)$.

FIG. 19 depicts an example user interface showing out-of-range transaction data, out-of-range host data for an out-of-range transaction and out-of-range component data for an out-of-range host. Various types of user interfaces or other output means can be provided. The example user interface 1900 includes a display region 1910 which identifies out-ofrange transaction data. Specifically, a transaction identified as "TR1" has a response time of 1.5 sec. which is not within the baseline response time +/− a deviation of 0.0-1.0 sec. For example, TR1 may be a transaction for buying a book on an e-commerce web site. The user interface could also identify other transactions whose response time is anomalous.

Further, a display region 1920 identifies out-of-range host data which is associated with the out-of-range transaction. Specifically, host A has a response time of 1.0 sec. which is not within the baseline response time +/− a deviation of 0.0-0.5 sec. The user interface could also identify other hosts whose response time is anomalous. For example, in the transaction for buying a book, host A may perform certain functions. Further, a display region 1930 identifies out-of-range component data which is associated with the out-of-range host data. Specifically, component C1A has a response time of 0.3 sec. which is not within the baseline response time +/− a deviation of 0.0-0.2 sec. The user interface could also identify other components whose response time is anomalous. Various alarms can be set when anomalous response times are detected. For example, an administrator can be paged or e-mailed with relevant information.

The user interface can similarly present information regarding other metrics such as error count and CPU load which are out-of-range. Further, in any case, the information can be ranked according to the degree to which the metrics are out-of-range. Other information such as a percentage by which a metric is out-of-range, a change in a metric over a specified time and/or a current value of a metric can also be provided.

Accordingly, the techniques provided can automatically analyze metrics such as response time, error data and/or CPU load, at the transaction, subsystem and/or component level, establish baseline times and detect when the metrics are out-of-range. This automatic base lining allows automatic triaging and diagnosis to identify an offending subsystem or component when there is a system anomaly. As a result, an administrator can be quickly alerted as to which area of an application is not operating properly and narrow the focus of investigation for fixing the problem. The administrator need not have knowledge of the normal range for the metrics as they are provided automatically. Further, the administrator need not manually determine which metrics are out-of-range or even know which subsystems are called. This avoids difficulties which occur when administrators don't know what metrics are normal, or there is too much data to manually analyze, e.g., when a network has many applications and backend system that all need to be monitored simultaneously. Moreover, unlike static thresholds, the baseline metrics can be automatically updated over time as network use changes, e.g., due to additional users, and factors such as time of day and day of week can be accounted for in setting the baseline metrics. Moreover, the administrator need not expend time to configure the baseline metrics or in correlating metrics from different sources.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for detecting anomalous behavior in a distributed system, comprising the following computer-implemented steps:
   in response to a plurality of subsystems in the distributed system performing processing for a plurality of execution paths: receiving first data which provides metrics for one level of a hierarchy of metrics, and receiving second data which provides metrics for another level of the hierarchy of metrics, lower than the one level, where the first and second data include identifiers of: (a) the plurality of execution paths and (b) components of the plurality of execution paths, including components which are software components of an application, where the software components include software components which execute at a single host computer, and the first and second data include data obtained from instrumentation at the single host computer;
   processing the first data to determine if the metrics for the one level contain an anomaly; and
   in response to determining that the metrics for the one level contain an anomaly:
      performing a drill down process which includes processing the second data to determine if the metrics for the another level contain an anomaly, where the second data is not processed to determine if the metrics for the another level contain an anomaly if the metrics for the one level are not determined to contain an anomaly;
      reporting the metrics for the one level which are determined to contain an anomaly; and
      reporting the metrics for the another level if the metrics for the another level are determined to contain an anomaly.

2. The computer-implemented method of claim 1, wherein:
   the metrics for the one level are determined to contain an anomaly based on comparisons using baseline metrics and associated deviation ranges.

3. The computer-implemented method of claim 1, wherein:
   the reporting the metrics for the one level comprises identifying at least one of the plurality of subsystems for which the metrics for the one level are determined to contain an anomaly.

4. The computer-implemented method of claim 1, wherein the first and second data include information identifying calling relationships among components of the plurality of subsystems, including components which are software components of an application, where the software components include software components which execute at a single host computer.

5. A computer-implemented method for detecting anomalous behavior at a host, comprising the following computer-implemented steps:
   receiving first data which identifies calling relationships among a first plurality of software components of at least one host during at least one transaction, the calling relationships among the first plurality of software components are indexed to an identifier of a first transaction context of the at least one transaction, the first data also identifies execution start and stop times for each of the calling relationships among the first plurality of software components;
   receiving second data which identifies calling relationships among a second plurality of software components, which differs at least in part from the first plurality of software component, the calling relationships among the second plurality of software components are indexed to an identifier of a second transaction context of the at least one transaction, and the second data identifies execution start and stop times for each of the calling relationships among the second plurality of software components, where the first data provides metrics for one level of a hierarchy of metrics, and the second data provides metrics for another level of the hierarchy of metrics, lower than the one level;

determining an elapsed execution time for each software component of the first plurality of software components based on the execution start and stop times of the first data;

determining a first response time, for the first transaction context, based on a difference between an earliest time and a latest time of the elapsed execution times of the first plurality of software components;

determining if the first response time is anomalous;

only if the first response time is anomalous: (i) determining an elapsed execution time for each software component of the second plurality of software components based on the execution start and stop times of the second data, (ii) determining a second response time, for the second transaction context, based on a difference between an earliest time and a latest time of the elapsed execution times of the second plurality of software components, and (iii) determining if the second response time is anomalous; and reporting, responsive to at least the determining if the first response time is anomalous.

6. The computer-implemented method of claim 5, wherein:

the reporting comprises identifying one or more of the first and second transaction contexts.

7. The computer-implemented method of claim 5, further comprising:

automatically establishing baseline metrics and deviation ranges for each of the software components, based on at least one of time of day and day of week.

8. At least one processor readable storage device having processor readable code embodied thereon for programming at least one processor to perform a method, the method comprising:

in response to a plurality of subsystems in a distributed system performing processing for a plurality of execution paths: receiving first data which provides metrics for one level of a hierarchy of metrics, and receiving second data which provides metrics for another level of the hierarchy of metrics, lower than the one level, where the metrics for the another level are metrics for software components of one or more applications of the plurality of subsystems for which the metrics for the another level are determined to contain an anomaly, where the software components include software components which execute at a single host computer;

processing the first data to determine if the metrics for the one level are anomalous;

processing the second data to determine if the metrics for the another level contain an anomaly only after determining that the metrics for the one level contain an anomaly; and reporting, responsive to the processing.

9. The at least one processor readable storage device of claim 8, wherein:

the reporting comprises identifying at least one of the plurality of subsystems for which the metrics for the one level are determined to contain an anomaly.

10. At least one processor readable storage device having processor readable code embodied thereon for programming at least one processor to perform a method, the method comprising:

receiving first data which identifies calling relationships among a first plurality of host computers during at least one transaction, the calling relationships among the first plurality of host computers are indexed to an identifier of a first transaction context of the at least one transaction, the first data also identifies execution start and stop times for each of the calling relationships among the first plurality of host computers;

receiving second data which identifies calling relationships among a second plurality of host computers, which differs at least in part from the first plurality of host computers, the calling relationships among the second plurality of host computers are indexed to an identifier of a second transaction context of the at least one transaction, and the second data identifies execution start and stop times for each of the calling relationships among the second plurality of host computers, where the first data provides metrics for one level of a hierarchy of metrics, and the second data provides metrics for another level of the hierarchy of metrics, lower than the one level;

determining an elapsed execution time for each host computer of the first plurality of host computers based on the execution start and stop times of the first data;

determining a first response time, for the first transaction context, based on a difference between an earliest time and a latest time of the elapsed execution times of the first plurality of host computers;

determining if the first response time is anomalous;

only if the first response time is anomalous: (i) determining an elapsed execution time for each host computer of the second plurality of host computers based on the execution start and stop times of the second data, (ii) determining a second response time, for the second transaction context, based on a difference between an earliest time and a latest time of the elapsed execution times of the second plurality of host computers, and (iii) determining if the second response time is anomalous; and reporting, responsive to at least the determining if the first response time is anomalous.

11. The at least one processor readable storage device of claim 10, wherein:

the reporting comprises identifying one or more of the first and second transaction contexts as anomalous.

12. The computer-implemented method of claim 1, wherein:

the drill down process is not performed when no metrics for the one level are determined to contain an anomaly.

13. The computer-implemented method of claim 1, wherein:

the metrics for the another level include metrics for software components of one or more applications of the plurality of subsystems for which the metrics for the another level are determined to contain an anomaly, where the software components include software components which execute at a single host computer.

14. The computer-implemented method of claim 5, wherein:

the first plurality of software components include software components which execute at a single host computer.

15. The computer-implemented method of claim 5, wherein:

the execution start and stop times for each of the calling relationships among the first and second pluralities of software components, including software components which execute at a single host computer, are provided using instrumentation.

16. The computer-implemented method of claim 1, wherein:
a response time is provided by at least one of: (a) the metrics for the one level of the hierarchy of metrics and (b) the metrics for the another level of the hierarchy of metrics.

17. The computer-implemented method of claim 1, wherein:
an error count is provided by at least one of: (a) the metrics for the one level of the hierarchy of metrics and (b) the metrics for the another level of the hierarchy of metrics.

18. The computer-implemented method of claim 1, wherein:
a CPU load is provided by at least one of: (a) the metrics for the one level of the hierarchy of metrics and (b) the metrics for the another level of the hierarchy of metrics.

19. The computer-implemented method of claim 1, wherein:
the one level is associated with the plurality of subsystems, and the another level is associated with at least one of a process, an application and a component of the plurality of subsystems.

20. The computer-implemented method of claim 19, wherein:
the process includes one or more applications, and the application includes one or more components.

21. The computer-implemented method of claim 1, wherein:
the plurality of subsystems comprise hosts, and the first and second data is received by a central manager from agents of the hosts in response to instrumentation at the hosts.

22. The computer-implemented method of claim 1, further comprising:
in response to the plurality of subsystems performing the processing for the plurality of execution paths: receiving third data which provides metrics for a further level of the hierarchy of metrics, lower than the another level; and
in response to determining that the metrics for the another level contain an anomaly:
continuing the drill down process by processing the third data to determine if the metrics for the further level contain an anomaly, where the third data is not processed to determine if the metrics for the further level contain an anomaly if the metrics for the another level are not determined to contain an anomaly; and
reporting the metrics for the further level if the metrics for the further level are determined to contain an anomaly.

23. The computer-implemented method of claim 1, further comprising:
in response to the plurality of subsystems performing the processing for the plurality of execution paths: receiving a common transaction identifier which is generated by one subsystem of the plurality of subsystems in response to a client request, and propagated to at least one other subsystem of the plurality of subsystems;
where the processing the first data to determine if the metrics for the one level contain an anomaly includes processing a portion of the metrics for the one level, based on the common transaction identifier; and
the processing the second data to determine if the metrics for the another level contain an anomaly includes processing a portion of the metrics for the another level, based on the common transaction identifier.

24. The computer-implemented method of claim 23, wherein:
the portion of the metrics for the one level is from multiple subsystems of the plurality of subsystems; and
the portion of the metrics for the another level is from only one subsystem of the plurality of subsystems.

25. The computer-implemented method of claim 23, wherein:
the subsystems include host computers;
the portion of the metrics for the one level is from multiple host computers of the plurality of subsystems; and
the portion of the metrics for the another level is from only one host computer of the plurality of subsystems.

26. The computer-implemented method of claim 1, further comprising:
in response to the plurality of subsystems performing the processing for the plurality of execution paths: receiving common transaction context data which is associated with a transaction;
where the processing the first data to determine if the metrics for the one level contain an anomaly includes processing a portion of the metrics for the one level, based on the common transaction context data; and
the processing the second data to determine if the metrics for the another level contain an anomaly includes processing a portion of the metrics for the another level, based on the common transaction context data.

27. The computer-implemented method of claim 26, wherein:
the common transaction context data comprises a URL.

28. The computer-implemented method of claim 26, wherein:
the common transaction context data comprises a user identifier.

29. The computer-implemented method of claim 26, wherein:
the common transaction context data comprises an HTTP parameter.

30. The computer-implemented method of claim 5, wherein:
the first and second data identify calling relationships in a common transaction.

31. The computer-implemented method of claim 5, wherein:
at least one of the first and second transaction contexts comprises at least one of a URL, a user identifier, and an HTTP parameter.

32. The at least one processor readable storage device of claim 8, wherein the method performed further comprises:
in response to the plurality of subsystems: receiving third data which provides metrics for a further level of the hierarchy of metrics, lower than the another level; and
in response to determining that the metrics for the another level contain an anomaly:
continuing the drill down process by processing the third data to determine if the metrics for the further level contain an anomaly, where the third data is not processed to determine if the metrics for the further level contain an anomaly if the metrics for the another level are not determined to contain an anomaly; and
reporting the metrics for the further level if the metrics for the further level are determined to contain an anomaly.

33. The at least one processor readable storage device of claim 11, wherein:
at least one of the first and second transaction contexts comprises at least one of a URL, a user identifier, and an HTTP parameter.

* * * * *

UNITED STATES PATENT AND TRADEMARK OFFICE
CERTIFICATE OF CORRECTION

| | | |
|---|---|---|
| PATENT NO. | : 7,818,418 B2 | Page 1 of 1 |
| APPLICATION NO. | : 11/688475 | |
| DATED | : October 19, 2010 | |
| INVENTOR(S) | : Bansal et al. | |

It is certified that error appears in the above-identified patent and that said Letters Patent is hereby corrected as shown below:

Col. 20, line 62: after "claim" and before "wherein" delete "11," and substitute therefore --10,--

Signed and Sealed this
Tenth Day of April, 2012

David J. Kappos
*Director of the United States Patent and Trademark Office*